Patented Oct. 8, 1940

2,217,264

UNITED STATES PATENT OFFICE

2,217,264

PROTEIN PREPARATION

Charles Weizmann, London, England

No Drawing. Application October 11, 1938, Serial No. 234,487. In Great Britain October 15, 1937

11 Claims. (Cl. 195—27)

This invention relates to protein preparations for foodstuff and/or medicinal purposes and the hydrolysis of protein substances. It relates also to processes involving the autolysis of yeast in adequately controlled conditions and the use of active yeast autolysates in producing an effective degradation of the proteinaceous fractions of vegetable or other proteins.

The present invention aims at an alternative process of proteolysis on the above lines to that described, e. g., in my copending United States application Serial No. 32,123 filed July 18, 1935 (now Patent No. 2,141,455), of which the present application is a continuation-in-part; or in my copending United States application Serial No. 153,283, in which latter the non-yeast proteinaceous substance, before being subjected to the action of the proteolytic yeast principles, is subjected to certain preliminary treatment. It also aims at providing a process whereby products, of generally the same character as and like quality to those obtainable from my aforesaid prior processes, may be obtained in a shorter time and in a simpler manner, e. g., without need for elevated temperatures and/or for the introduction of foreign substances such as mineral acids.

The invention is based in part upon my said former inventions and in part upon the prior knowledge of proteolytic enzymes and the effects of these in solubilizing and in degrading proteins. In this later connection, for instance, it is known that in correct pH conditions unactivated papain (obtainable from Carica papaya) solubilizes protein, and furthermore, when activated it degrades, to or towards amino-acids, proteins already solubilized. Such characteristics of papain, not ordinarily possessed by proteolytic enzymes, even in varying degree, are put to a very definite and particular use in the present invention in connection with, namely in preparation for, proteolysis by the active principles of yeast; and in contrast to already known methods in which enzymes are caused to act upon proteins, a degradation both remarkably rapid and exhaustive is consistently obtainable in a simple manner which, in addition, lends itself well to economical commercial working scale. The choice of and/or the mode of using enzymes for a satisfactory result is or are restricted by considerations affecting temperatures, pH values or both. Thus an enzyme may have, for instance, an optimal temperature for one duty substantially different from that for another duty, or from that of the proteolytic enzymes or enzyme series (e. g., proteinase, polypeptidase, dipeptidase) of a yeast autolysate carefully prepared: the same may apply in respect to optimal pH values. These considerations govern the conditions under which solution of proteins and extensive degradation thereof may be effected, and they may seriously inhibit the obtaining of consistent satisfactory results by any mode of attacking proteins in which a variety of enzymes is expected or caused to act in the presence of each other.

The invention consists in subjecting proteinaceous materials other than yeast to extensive and rapid solubilizing by proteolytic enzymes and, as a separate measure, thereafter proteolytically degrading the solubilized protein by the action of proteolytic enzymes of a yeast autolysate preferably containing an activator for unactivated enzymes already present.

Hereinafter in the absence of qualification the terms "proteinaceous materials," "protein substance" and similar terms are to be understood to exclude yeast itself which would ordinarily fall within such terms.

The invention further consists in a method as indicated, utilizing for the solubilizing pretreatment enzymes such as papain and bromelin related to those proteolytic enzymes which are natural to yeast and appear in a carefully prepared autolysate thereof.

The invention also consists in the use of solubilizing enzymes having an optimal pH and/or temperature range not substantially different from the optimal pH for the subsequent degradation, to obviate or reduce the need for adjustment.

The invention also consists in separately preparing (a) an aqueous mixture of protein substance and proteolytic enzymes such as papain or bromelin preferably in unactivated condition, and (b) an aqueous mixture of yeast and plasmolysing agent; maintaining the two mixtures for a few hours at temperatures, and if necessary other conditions, promoting solubilizing and extensive autolysis respectively; intimately associating the two products at the end of said period and incubating the resulting mixture preferably for a longer period and under pH and temperature conditions conforming to those employed in the yeast autolysis.

The invention also consists in methods of degrading proteins of proteinaceous substances substantially as hereinafter indicated.

The invention also consists in preparations comprising a high content of amino-acids, and generally degraded protein, enzymes and vitamins, when prepared as above indicated or more fully described hereinafter.

In general, according to the present invention, the proteinaceous material, which may be soya meal, peanut meal or any of the other more or less refractory or insoluble vegetable or other, e. g., animal, materials referred to in my said copending application No. 152,283, e. g., brewer's grains, casein, milk powder, is made into an aqueous mass and there is added to it a quantity of proteolytic enzymes in solution or suspension in water, such as papain or bromelin or the better known proteolytic enzymes such as pepsin or trypsin. These enzymes, used for presolution, may be purified isolated substances or the crude plant preparations, e. g., papain latex powder from *Carica papaya* or bromelin from *Ananassa sativa* or pineapple juice. After a period of only a few hours, depending upon the nature and the proportion of the enzyme used, at the optimal temperature for the enzyme (say, in the case of papain, 65–70° C.) and provided also the pH is at or close to the optimum for the particular enzyme used (e. g., 5–7.2 for papain), there is obtained one of the important intermediate products in the carrying out of this invention, viz. a more or less complete solution of the protein, occasionally 100%. The degradation, as distinct from solubilization, is not great, the amino-nitrogen or amino-acids content of the solution not usually exceeding 15%, on the whole weight solubilized, with starting materials such as those above named.

It is important to note the positive presence of some amino-acid; it is equally important to note its quite small yet considerable percentage (compared with the ultimate product) which is all that is expected and desired out of this stage of the invented process in view of subsequent actions.

Concurrently with the solubilizing of presolution as above, a second intermediate product important in this invention, viz. a yeast autolysate, is carefully prepared, in accordance preferably with my aforesaid copending application No. 32,123, and the said two hitherto isolated processes can, for the purposes of the invention, be terminated together, and, say, about 6 hours from a common time of starting. Their respective products, i. e., strong protein solution and yeast autolysate, are then mixed together at a temperature of about 40° C., i. e., 35 to 42° C., stirred for a period of say 18 hours, whilst the temperature is maintained at about the value mentioned and the optimal pH for the enzymic reactions is adhered to as closely as possible, as can be ensured, if necessary, by addition of alkaline or buffering agents to the mixture in the way explained in relation to the yeast-autolysis per se in application No. 32,123. Generally the mixture is already sufficiently buffered by reason of the buffered nature of the yeast autolysate on which the high quality thereof has at least in part been dependent. The product on analysis may show as much as 100% of the total protein (from all sources, yeast or non-yeast) to be in solution and the remarkably high percentage, say 53% of the total solubilized protein as amino-nitrogen: it may then be centrifuged or filtered to remove insoluble matter; and the clear liquor may be concentrated by evaporation preferably in vacuo, care being taken to avoid, by overheating or otherwise, destruction of or damage to delicate enzymes, vitamins or other fractions. Before or after such treatments the product is distinguishable, by its almost wholly predigested or preassimilated character, from products which, owing to a deficiency of enzymic degradation (whether by reason of too short treatment or of too confused, complex or unsuitable circumstances of enzymic action), cannot be regarded as of any remarkable alimentary value, inasmuch as they contain incompletely degraded substances such as peptones and peptides and no such high amino-acid content as is obtained according to the present invention.

The presolution of the proteinaceous material may, according to the invention, be effected quite satisfactorily by means of animal enzymes such as pepsin or trypsin; the use of such requires thorough readjustment of pH in preparation for the next stage, and readjustment is admissible when these enzymes have completed their essential function of first-stage solubilizers herein. But apart from the commercial advantage had by papain or bromelin as constituents of alimentary substances (on account of their vegetable origin as distinct from the animal origin of pepsin and other enzymes) and on account of their being utilizable not only as purified isolated substances but also as crude plant preparations, e. g., papain latex or pineapple juice, papain and bromelin have the advantages (a) that until activated they practically only solubilize protein, and they do so easily and rapidly; and (b) that papain and bromelin are themselves then readily activated for intensive proteolytic action by the "glutathione" activator which is present in well-prepared yeast autolysates, and is thus furnished at the commencement of the second stage, i. e., when the mixture of the two solutions is made and the desired process has become essentially one of intensive and rapid proteolytic degradation. Again papain has an optimal pH which, unlike those of other enzymes, coincides with the isoelectric point of protein substrate, and which is so close to the optimal pH for the proteolysis by yeast-enzymes (about 6.3–6.6) that adjustment of the pH of the protein solution, before it is mixed with the autolysate, either is unnecessary or is easily made without introducing products of neutralisation to any substantial extent.

The method as a whole has the advantage that, after the mixing of the solutions, the enzymes of the yeast autolysate have no other (or substantially no other) action to perform on the proteins than one of degradation, the solubilizing of that protein component having already been completed. Further, it allows of conducting the degradation methodically so as to obtain any desired degree of proteolysis; the stages being determinable by the quantity of amino-acid formed. Further, the whole process can easily be finished within 24 hours or even less, and in this respect is commercial where other processes require longer and inconvenient times.

In a general way the preparation of active yeast autolysate in accordance with my said copending United States application Serial No. 32,123, and for the purpose of the present invention, is as follows:

The yeast is preferably fresh moist pressed yeast and its plasmolysis is effected by addition of a relatively small quantity, say, 5 to 10 per cent. of a cell poison. For the most generally satisfactory action I have found the most suitable substances to be such as have substantial lipoid- and water-solubilities, and for the purpose of the present invention ethyl acetate has been found of special utility on account of its rapid action and the fact that it is innocuous to the proteolytic enzymes in the yeast; which enzymes or protease are of primary importance herein and are proteinase (breaking down high molecular weight proteins to peptones and polypeptides), polypeptidase (breaking down polypeptides to dipeptides), and lastly dipeptidase (breaking down dipeptides to amino-acids), all capable of acting hydrolytically to constitute the process called proteolysis. Experiment has shown the last enzyme, dipeptidase, to be particularly delicate, and in a measure this accounts for the selection herein of ethyl acetate as plasmolyser and also for the exclusion of chloroform and carbon tetrachloride which in such capacity are found or believed to destroy the said enzyme. Toluene has not the specific defect indicated, but its action is too slow for the best results, at least when used alone.

Using 5 per cent. ethyl acetate as above, at normal or room temperature, plasmolysis is completed in 5 to 10 minutes and, while the resulting liquid is in suitable condition for autolytic processes, it is from this point that particular care is necessary. If the liquid is merely allowed to stand unattended at a temperature permitting enzymic action it becomes more and more acid due to the formation of acids by the disorganised and uncontrolled action of enzymes in the poisoned cell. The acidity reaches about pH 5 to 4.5 after about half an hour or an hour, depending on the freshness of the yeast, $CO_2$ previously present in the form of carbonate being driven out at such acidities and the phenomenon of "sparkling" takes place.

As distinct from such method, however, I do not permit the plasmolysed yeast medium to become so acid, as such acidity is sufficient to prevent or seriously inhibit passage of enzymes into solution. On the contrary I add a 5 per cent. solution of tribasic sodium phosphate $(NaPO_4.12H_2O)$ not at once the amount expected to be sufficient to neutralize the acid formed say in the following 24 hours, but gradually in such amounts as will keep the pH within the optimal range, viz. 6.3 to 6.6. Control of acidity as above may be effected in a variety of ways, but I have found electrometric titration methods of special utility.

According to one illustrative specific example: 400 g. yeast were plasmolysed with 20 ccs. ethyl acetate, after liquefaction diluted with 400 ccs. water, stirred and the initial pH measured was found to be (544 millivolt) pH=4.9. 60.9 ccs. of 5 per cent. sodium phosphate were immediately added to obtain (610 mv.) pH 6.34. Further additions of phosphate were so regulated that the potentiometer showed always 610 mv., i. e., pH=6.34. On one occasion, overnight, the acidity increased somewhat, viz. to pH=5.8. The proteolysis was allowed to continue overnight and the acidity was again adjusted next morning. A total of 162.6 ccs. of phosphate were added over a period of 24 hours. From plasmolysis onwards the temperature was kept at or close to 36° C.

It will be understood that control of acidity, as above, may be obtained by use of an alkali, e. g. sodium carbonate, by giving continuous attention to the proteolysis and by making frequent and regular additions of calculated small amounts of the alkali to combat the tendency for the acidity to increase. This, however, is troublesome and the use of a buffering compound as, for instance, trisodium phosphate, as indicated in the example, enables quite substantial additions to be made at considerable intervals without either reducing the acidity to such an extent as to injure the alkali-sensitive dipeptidase, or yet permitting within quite long unattended periods of time increase of the acidity to pH values outside the optimal pH limits.

It will be seen then that the principal requirement for proper and practical acidity control is the use of a buffering compound. Of such there are a number, but I have found the most suitable to be alkaline phosphates; and a sodium salt is chosen in view of the fact that edible substances are my ultimate aim.

The importance of my processes as illustrated above can be best appreciated by contrasting the same with a known process in which acidities of the order of pH=5 obtain in the autolysis:

A portion of fresh bakers' yeast was divided in two parts, the first being plasmolysed and kept neutral according to my method described above; the second being mixed with one-third of its weight of water and 4 per cent. of a mixture of equal parts of toluene and chloroform, and both being kept in an incubator for a period of 48 hours. Both products were then filtered and separately adjusted to the same pH=6.37. The calculated number of ccs. corresponding to 5 g. yeast was added in each case to 30 ccs. of 4 per cent. gelatine and made up with water to 50 ccs. After 24 hours 1 cc. was taken out of each and the amino-acids formed were determined by titration in alcohol solution with 0.4 n. alcohol KOH, using Thymolphthalein as indicator. The results of these comparative experiments showed the respective yields to be as 4:1.

A rapid process of autolysis can thus be provided for such that the nitrogenous contents of the yeast cells become solubilized and practically all of the nitrogenous products are obtainable in aqueous solution. The solution thus obtained is rich in vitamins and enzymes, especially proteolytic.

The efficiency of the process in respect of the solubilizing of the yeast protein, as well as the rapidity of the process, can be judged from the following example:

400 g. of bakers' yeast were liquefied by mixing with 40 ccs. of ethyl acetate; a quantity of toluene sufficient to form a protective antiseptic film over the magma were then added together with 1600 ccs. of water and the mixture thereupon incubated at 36° C. After 22½ hours' incubation with acidity control on the lines already indicated, a sample was filtered and the specific gravity of the filtrate determined approximately by hydrometer. A nitrogen estimation was also made of the filtrate in order to determine the amount of soluble nitrogenous substances. Similar observations were made at the end of 42½ hours and 89 hours. The table below gives the results obtained.

| Time of incubation | Specific gravity of filtrate | Soluble nitrogenous substances calculated as protein in the whole mixture |
|---|---|---|
| | | Grams |
| 22½ hours | 1.014 | 43.7 |
| 42½ hours | 1.0145 | 48.1 |
| 89 hours | 1.015 | 49.0 |

Now, the total amount of nitrogenous substances, calculated as protein, in 400 grams of the particular sample of yeast used was found to be 51 grams; the results given above therefore indicate that practically the whole of the protein is rendered soluble in 89 hours, and a very considerable proportion in the first 24 hours.

It will be noted, in the last example that toluene was added. Its function here is essentially that of a powerful antiseptic, inhibiting bacterial fermentation so as to ensure unrestricted enzymatic action. Where an antiseptic addition is essential for obtaining aseptic conditions, toluene can of course be replaced by other substances, subject, however, to the exclusion of chloroform and others injurious to any one or more of the proteolytic enzymes of the yeast. Preferably the antiseptic is such as is not too volatile and on the other hand is capable of forming an effective sterilizing layer upon the reaction mixture; it should, if injurious in foodstuffs, be capable of expulsion in a simple way.

The autolysate may alternatively and preferably be employed for the treatment of other proteins, especially vegetal proteins, and it is in such usage that the possession by the yeast autolysate or the production by the process of autolysis of a natural range of proteoclastic enzymes displays a particular advantage. Its high enzymatic activity when prepared according to the foregoing directions renders it specially suitable for such a purpose and its use to such an end enables satisfactory control to be had of the proteolysis of such other proteins and leads to high overall yields of products of notable enzymatic and vitamin activity.

Inasmuch as, in illustrations of the present invention, the numbered examples later set forth herein call for the separate preparation of an active yeast autolysate, such autolysate is to be understood to be prepared in accordance with the following example, subject only to unimportant departures.

PREPARATION OF AUTOLYSED YEAST 150 grams of fresh bakers' yeast was plasmolysed with 5 per cent. by weight of ethyl acetate and then autolyzed for twenty-four hours at room temperature; during the autolysis 150 cc. of a 7 per cent. sodium phosphate ($Na_2HPO_4 2H_2O$) solution was added to maintain the reaction at the desired pH, viz. about 6.3 to 6.6.

In general, as plasmolysing agent I prefer to use alkyl esters, for example, ethyl acetate (as above) having a relatively high plasmolytic activity. It is of importance also, especially if a buffering compound is not used for acidity control, to effect mixing in of the alkali rapidly so as to avoid local over-concentration. I may additionally introduce before or during proteolysis an auxiliary enzyme or enzymes, with the effect of further accelerating the process, e. g., papain, or amylase from any suitable source. I contemplate such addition more especially when proteolysing other substances besides the yeast and more especially to compensate for any reduction or shortage of enzymatic activity as may occur from various causes such as imperfection of the yeast proteolysis and/or low or not particularly suitable enzymatic content of the vegetal or other protein substance.

The procedure according to the present invention after mixture of yeast autolysate with the magma of predigested proteinaceous material is illustrated by this, that in aseptic conditions, ensured if required by the addition of antiseptic substance, the mixture is incubated also at about 36° C. and a relatively quick proteolysis takes place, with a very high total yield. Toluene serves as a satisfactory antiseptic for the mixture.

The following are some specific examples of the invention, it being understood, however, that these are given only in illustration:

EXAMPLE I.—*Proteolysis of soya meal*

(a) Predigestion of soya meal with papain. 400 gms. soya meal, containing 192 gms. protein, is mixed with 1600 ccs. hot water and 1.6 gms. papain (pure and unactivated) and the mixture is stirred for 6 hours at 65–70° C. After 6 hours it is cooled to 40° C. and is ready for mixture with yeast autolysate. (Analysis: in solution 100% protein: (only) 12.2% amino-N.)

(b) Yeast autolysate: this is made as above explained; 450 gms. yeast containing 60 gms. protein being mixed with 22.5 ccs. ethyl acetate and plasmolysed, diluted with 400 ccs. water, and stirred at 37° C. Tri-sodium phosphate solution is gradually added to maintain pH 6.46 during 6 hours.

The products of (a) and (b) are then mixed, and stirred at 40° C. for 18 hours in aseptic conditions. (Analysis of the mixture after 24 hours from the start, i. e., 18 hours after association of the two liquors: in solution 99% protein; 53.6% amino-N.) The mixture is thereupon centrifuged and the clear solution may be concentrated by evaporation in vacuo.

EXAMPLE II.—*Proteolysis of soya meal*

(a) Predigestion of soya meal with papain latex. 1 kg. soya meal, containing 480 gms. protein, is mixed with 4 liters hot water and 0.5–1.0 gm. crude papain latex and the mixture is stirred for 6 hours at 65–70° C. After 6 hours it is cooled to 40° C. and is ready for mixture with yeast autolysate.

(b) Yeast autolysate; this is made as in Example I; 1.125 kg. yeast, containing 150 gms. protein, being mixed with 55 ccs. ethyl acetate and plasmolysed, diluted with 1 liter water, and stirred at 37° C. Tri-sodium phosphate solution is gradually added to maintain pH 6.43 during 6 hours.

The products (a) and (b) are then mixed, and stirred at 40° C. for 18 hours in aseptic conditions. (Analysis of the mixture after 24 hours from the start, i. e. 18 hours after association of the two liquors: in solution 100% protein; 52% amino-N.) The mixture is thereupon centrifuged and the solution concentrated by evaporation in vacuo.

EXAMPLE III.—*Proteolysis of soya meal*

(a) Predigestion of soya meal with pepsin. 400 gms. soya meal, containing 192 gms. protein, is mixed with 1600 ccs. water, containing 1% hydrochloric acid, and 2 gms. pepsin and the mixture is stirred for 6 hours at 40° C. After 6 hours dilute sodium hydroxide solution is slowly added whilst being stirred in order to bring the pH to 6.4 and then it is ready for mixture with yeast autolysate.

(b) Yeast autolysate is made as above, taking 450 gms. yeast, containing 60 gms. protein. Plasmolysis is effected and autolysis conducted for 6 hours at pH 6.4.

The products of (a) and (b) are then mixed, and stirred at 40° C. for 18 hours in aseptic conditions. (Analysis of the mixture after 24 hours from start onwards: in solution 90.5% protein; 47% amino-N.)

EXAMPLE IV.—*Proteolysis of ground-nut cake meal (peanuts)*

(a) Predigestion of peanut meal with papain. 40 gms. peanut meal (de-oiled), containing 26 gms. protetin, is mixed with 360 ccs. hot water and 0.4 gm. papain (unactivated) and the mixture stirred for 6 hours at 65–70° C. It is then cooled to 40° C. and is ready for mixture with yeast autolysate. (Analysis: in solution 88% protein; (only) 10% amino-N.)

(b) Yeast autolysate is made as in Example I, taking 60 gms. yeast containing 8 gms. protein. Plasmolysis is effected and autolysis conducted in 6 hours at pH 6.4.

The products are mixed as above, and stirred for 18 hours at 40° C. in aseptic conditions (Analysis of the mixture after 24 hours from start onwards: in solution 92% protein; 41.5% amino-N.)

EXAMPLE V.—*Proteolysis of ground-nut cake meal (peanuts)*

(a) Predigestion of peanut meal with papain latex. 1 kg. peanut meal (de-oiled), containing 0.5 kg. protein, is mixed with 4 liters hot water and 4 gms. crude papain latex and the mixture stirred for 6 hours at 65–70° C. It is then cooled to 40° C. and is ready for mixture with yeast autolysate.

(b) Yeast autolysate is made as above, taking 1.125 kg. yeast, containing 150 gms. protein. Plasmolysis is effected and autolysis conducted for 6 hours at pH 6.4.

The products are mixed and stirred for 18 hours at 40° C. in aseptic conditions.

(Analysis of the mixture after 24 hours from start onwards: in solution 92% protein; 47.2% amino-N.)

EXAMPLE VI.—*Proteolysis of casein*

(a) Predigestion of casein with papain. 50 gms. casein containing 44.5 gms. protein, is mixed with 450 ccs. hot water and 0.9 gm. papain (unactivated) and stirred for 6 hours at 65–70° C. When cooled to 40° C. it is ready for mixture with yeast autolysate.

(Analysis: in solution 86% protein; (only) 8.5% amino-N.)

(b) Yeast autolysate is made as above, taking 100 gms. yeast containing 13.4 gms. protein. Plasmolysis is effected and autolysis conducted in 6 hours at pH 6.4.

The products are then mixed and stirred for 18 hours at 40° C. in aseptic conditions.

(Analysis of the mixture after 24 hours from start onwards: in solution 98% protein; 46% amino-N.)

EXAMPLE VII.—*Proteolysis of casein*

(a) Predigestion of casein with papain. 200 gms. casein containing 181.3 gms. protein, is mixed with 800 ccs. hot water and 1.8 gms. papain (unactivated) and stirred for 6 hours at 65–70° C. When cooled to 40° C. it is ready for mixture with yeast autolysate.

(Analysis: in solution 86% protein; (only) 8.5% amino-N.)

(b) Yeast autolysate is made as above, taking 450 gms. yeast containing 60 gms. protein. Plasmolysis is effected and autolysis conducted in 6 hours at pH 6.4.

The products are then mixed and stirred for 18 hours at 40° C. in aseptic conditions.

(Analysis of the mixture after 24 hours from start onwards: in solution 87% protein; 52% amino-N.)

I claim:

1. The process which comprises mixing a proteinaceous material with water and with a proteolytic enzyme, selected from a class consisting of papain, bromelin and crude plant preparations containing such enzymes, incubating the mixture under conditions producing substantial solubilization of the proteins present, with the degradation of a small proportion only of the proteins to the amino form, mixing into the resulting magma a separately prepared autolyzed yeast and incubating the mixture under conditions producing substantial degradation of the solubilized protein to form amino acids.

2. The process which comprises mixing an unactivated proteolytic enzyme, selected from a class consisting of papain, bromelin and crude plant preparations containing such enzymes, with an aqueous mixture of proteinaceous material, incubating the mixture under conditions producing the substantial solubilization of the proteins present, then adding a separately prepared autolyzed yeast, thereby producing activation of said enzyme, and incubating the mixture under conditions favoring proteolysis by the enzymes contained in the autolyzed yeast.

3. The process of claim 2 wherein the enzyme employed is papain, the first incubation is conducted at about 65° to 70° C. and at a pH of about 5 to 7.2 for a period of about 6 hours, and the second incubation is conducted at about 35° to 42° C. for a period of about 18 hours.

4. The process of claim 1 wherein said yeast autolysate is prepared contemporaneously with said first-mentioned incubative treatment of said proteinaceous material and such pH adjustment is effected as may be required substantially to equalize the respective pH values of the component magmas to be mixed.

5. The process of claim 1 wherein said yeast autolysate is prepared contemporaneously with said first-mentioned incubative treatment of said proteinaceous material and such temperature adjustment is effected as may be necessary substantially to equalize the respective temperatures of the component magmas to be mixed.

6. The process of claim 1 wherein said autolysate is prepared by the method which comprises mixing yeast with up to about 10% of its weight of a plasmolysing agent innocuous to proteolytic enzymes to effect plasmolysis in a period of the order of ten minutes, incubating the plasmolysate to permit autolysis to take place at a temperature of about 36° for a period of about six hours, and adding alkaline substances to the magma throughout the time of said incubation in quantities and at intervals regulated to maintain the pH within the approximate range of 6.3 to 6.6.

7. The process of claim 1 wherein said yeast autolysate is prepared by the method which comprises mixing ethyl acetate with yeast, adding toluene as an antiseptic, and water, and incubating the magma for a period of approximately six hours while adding tri-sodium phosphate to maintain the pH within the approximate range of 6.3 to 6.6.

8. The process of claim 1 wherein said yeast autolysate is prepared by the method which comprises mixing yeast with up to about 10% of its weight of ethyl acetate to effect plasmolysis in the period of the order of ten minutes, and incubating the plasmolysate whilst making additions of sodium phosphate to the magma throughout the time of said incubation in quantities and at intervals regulated to maintain the pH within the approximate range of 6.3 to 6.6 to produce yeast autolysate.

9. The process of claim 1 wherein said aqueous mixture is prepared from proteinaceous material, water and enzymes in the approximate weight ratio of 1000:4000–9000:1–18.

10. The process of claim 1 wherein said aqueous mixture is prepared from soya meal, water and papain in the approximate weight ratio of 1000:4000:1–3.

11. The process of claim 1 wherein papain is employed for said first-mentioned incubation which is conducted at a temperature of about 65–70° C. and a pH of about 5–7.2, followed by a reduction of the temperature to about 35–42° C. for said mixing step.

CHARLES WEIZMANN.